United States Patent
Wang et al.

(10) Patent No.: US 12,234,351 B2
(45) Date of Patent: Feb. 25, 2025

(54) RANDOM PROPYLENE POLYMER COMPOSITION AND USE IN EXTRUSION BLOW MOULDING

(71) Applicant: BOREALIS AG, Vienna (AT)

(72) Inventors: Jingbo Wang, Linz (AT); Markus Gahleitner, Linz (AT); Friedrich Berger, Linz (AT); Karlheinz Friedrich, Schwechat (AT)

(73) Assignee: BOREALIS AG, Vienna (AT)

( * ) Notice: Subject to any disclaimer, the term of this patent is extended or adjusted under 35 U.S.C. 154(b) by 739 days.

(21) Appl. No.: 17/423,407

(22) PCT Filed: Jan. 15, 2020

(86) PCT No.: PCT/EP2020/050883
§ 371 (c)(1),
(2) Date: Jul. 15, 2021

(87) PCT Pub. No.: WO2020/148319
PCT Pub. Date: Jul. 23, 2020

(65) Prior Publication Data
US 2022/0073718 A1    Mar. 10, 2022

(30) Foreign Application Priority Data
Jan. 15, 2019  (EP) .................................. 19151936

(51) Int. Cl.
| | |
|---|---|
| C08L 23/14 | (2006.01) |
| B29C 49/04 | (2006.01) |
| C08F 2/00 | (2006.01) |
| C08F 4/646 | (2006.01) |
| C08F 4/649 | (2006.01) |
| C08F 4/654 | (2006.01) |
| C08F 210/02 | (2006.01) |
| C08F 210/14 | (2006.01) |
| B29K 23/00 | (2006.01) |
| B29L 31/00 | (2006.01) |

(52) U.S. Cl.
CPC ............ *C08L 23/142* (2013.01); *B29C 49/04* (2013.01); *C08F 2/001* (2013.01); *C08F 4/6465* (2013.01); *C08F 4/6492* (2013.01); *C08F 4/6545* (2013.01); *C08F 4/6548* (2013.01); *C08F 210/02* (2013.01); *C08F 210/14* (2013.01); *B29K 2023/14* (2013.01); *B29L 2031/7158* (2013.01); *C08L 2205/025* (2013.01); *C08L 2205/06* (2013.01); *C08L 2205/24* (2013.01); *C08L 2308/00* (2013.01); *C08L 2314/02* (2013.01)

(58) Field of Classification Search
CPC .. C08L 23/14; C08L 2203/10; C08L 2205/02; C08L 2205/025
See application file for complete search history.

(56) References Cited

U.S. PATENT DOCUMENTS

| | | | |
|---|---|---|---|
| 2004/0014595 A1* | 1/2004 | Morini ................... | C08F 4/651 502/118 |
| 2013/0236668 A1* | 9/2013 | Bernreitner ............ | C08L 67/00 524/145 |

FOREIGN PATENT DOCUMENTS

| | | |
|---|---|---|
| KR | 20120113420 A | 10/2012 |
| WO | 2011131578 A1 | 10/2011 |
| WO | 2014090818 A1 | 6/2014 |
| WO | 2014206950 A1 | 12/2014 |
| WO | 2020148319 A1 | 7/2020 |

OTHER PUBLICATIONS

International Search Report and Written Opinion of The International Searching Authority for related International Application No. PCT/EP2020/050883, dated Apr. 14, 2020, 12 pages.

* cited by examiner

*Primary Examiner* — Robert C Boyle
(74) *Attorney, Agent, or Firm* — DITTHAVONG, STEINER & MLOTKOWSKI

(57) ABSTRACT

The present invention is directed to a propylene polymer composition comprising at least one propylene copolymer (C-PP), and an α-nucleating agent (NU), wherein the propylene copolymer (C-PP) comprises two propylene copolymer fractions (PP1) and (PP2), wherein propylene copolymer fraction (PP1) is contained in the propylene copolymer (C-PP) in an amount of 30 to 70 wt. % and the propylene copolymer fraction (PP2) is contained in the propylene copolymer (C-PP) in an amount of 70 to 30 wt. %, the comonomer content of propylene copolymer fraction (PP1) is in the range of 0.5 to 2.5 wt.-% and the comonomer content of the propylene copolymer fraction (PP1) is lower compared to the comonomer content of the propylene copolymer fraction (PP2), and the propylene polymer composition has (a) a melt flow rate $MFR_2$ (230° C.) measured according to according to ISO 1133 of 1 to 5 g/10 min., and (b) a comonomer content of 4.0 to 8.0 wt. %, the comonomer (s) being ethylene and/or at least one $C_4$ to $C_{12}$ α-olefin. The above propylene polymer composition has improved impact and optical properties. The invention further provides a method of producing the above propylene polymer composition and an extrusion blow molded article comprising the above propylene polymer composition.

14 Claims, No Drawings

RANDOM PROPYLENE POLYMER COMPOSITION AND USE IN EXTRUSION BLOW MOULDING

The present invention is directed to a new random propylene polymer composition suitable for extrusion blow moulding as well as to the use of the random propylene polymer composition to improve the optical properties of an extrusion blow molded article.

It is well known in the polymer field that different applications require specifically tailored polymers to achieve the individual demanding properties. For instance a polymer used for injection molding must necessarily have other properties as a polymer used for blow molding.

The extrusion blow molding process for instance is a very special process that allows in a flexible and cheap way the preparation of different kind of bottles with respect to size and shape. One main disadvantage in this process is the complexity of the solidification step compared to normal injection molding.

In the extrusion blow molding (EBM) process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blown molded articles, like bottles, normally show inferior optical properties compared to any injection molded articles. For instance, the surface property inside and/or outside of extrusion blown bottles is typically non-uniform (flow lines, melt fracture) leading to lower overall gloss and transparency compared to injection molded bottles or injection stretched blown molded articles (ISBM).

In addition, the extrusion blow molded (EBM) products must have a rather high impact to prevent damages caused by drop cracking when falling from high altitudes and should have a rather high melting point which further extends the area of application.

Thus, there is still the demand to produce extrusion blow molded (EBM) products with improved optical and mechanical properties, particularly low haze, high flexural properties and high impact strength.

Thus the object of the present invention is to provide a propylene copolymer composition to produce extrusion blow molded articles with improved optical and mechanical properties, such as high impact and stiffness as well as low haze. Further said extrusion blow molded articles should have high safety without health concerns in food contact applications.

These object can be achieved by the finding of the propylene copolymer composition according to the present invention comprising a propylene copolymer with rather low melt flow rate, improved comonomer distribution, and high melting and crystallization temperatures.

Accordingly the present invention is directed to a propylene polymer composition comprising at least one propylene copolymer (C-PP), and an α-nucleating agent (NU), wherein the propylene copolymer (C-PP) comprises two propylene copolymer fractions (PP1) and (PP2), wherein
propylene copolymer fraction (PP1) is contained in the propylene copolymer (C-PP) in an amount of 30 to 70 wt. % and the propylene copolymer fraction (PP2) is contained in the propylene copolymer (C-PP) in an amount of 70 to 30 wt. %,
the comonomer content of propylene copolymer fraction (PP1) is in the range of 0.5 to 2.5 wt.-% and the comonomer content of the propylene copolymer fraction (PP1) is lower compared to the comonomer content of the propylene copolymer fraction (PP2), and the propylene polymer composition has
(a) a melt flow rate $MFR_2$ (230° C.) measured according to according to ISO 1133 of 1 to 5 g/10 min., and
(b) a comonomer content of 4.0 to 8.0 wt. %, the comonomer(s) being ethylene and/or at least one $C_4$ to $C_{12}$ α-olefin.

The above propylene polymer composition surprisingly has improved impact and optical properties.

In the following the propylene copolymer (C-PP) being part of the propylene polymer composition of the present invention is defined. Subsequently the use of the propylene polymer composition to improve the optical properties of an extrusion molded article comprising the propylene polymer composition is described.

Propylene Copolymer (C-PP)

As regards the polymeric components, the propylene polymer composition of the invention comprises, preferably consists of the propylene copolymer (C-PP). Thus, the property profile and the parameters of the composition according to the present invention are determined to a major part by the respective properties of the propylene copolymer (C-PP).

The propylene copolymer (C-PP) is preferably monophasic. Accordingly it is preferred that the propylene copolymer (C-PP) does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene copolymer (C-PP) according to this invention has no glass transition temperature below −30, preferably below −25° C., more preferably below −20° C.

On the other hand, in one preferred embodiment the propylene copolymer (C-PP) or the propylene polymer composition according to this invention has a glass transition temperature in the range of −12 to +2° C., more preferably in the range of −10 to +2° C.

The propylene copolymer (C-PP) according to this invention may have a melt flow rate $MFR_2$ (230° C.) measured according to ISO 1133 in the range of 0.5 to 3.5 g/10 min, more preferably in the range of 0.8 to 3.2 g/10 min, still more preferably in the range of 1.0 to 3.0 g/10 min.

The propylene copolymer (C-PP) comprises apart from propylene also comonomers.

Preferably the propylene copolymer (C-PP) comprises apart from propylene ethylene and/or $C_4$ to $C_{12}$ α-olefins. Accordingly the term "propylene copolymer" according to this invention is preferably understood as a polypropylene comprising, preferably consisting of, units derivable from propylene, ethylene and/or $C_4$ to $C_{12}$ a-olefins.

Thus the propylene copolymer (C-PP) according to this invention preferably comprises monomers copolymerizable with propylene, for example comonomers such as ethylene and/or $C_4$ to $C_{12}$ a-olefins, in particular ethylene and/or $C_4$ to $C_8$ a-olefins, e.g. 1-butene, 1-hexene and/or 1-octene. Preferably the propylene copolymer (C-PP) according to this invention comprises, especially consists of, monomers copolymerizable with propylene from the group consisting of ethylene, 1-butene, 1-hexene and 1-octene. More specifically the propylene copolymer (C-PP) of this invention comprises—apart from propylene—units derivable from ethylene and/or 1-butene. In a preferred embodiment the propylene copolymer (C-PP) according to this invention comprises units derivable from ethylene and propylene only.

Additionally it is appreciated that the propylene copolymer (C-PP) preferably has a comonomer content in a very specific range which contributes to the impact strength and the good optical properties. Thus it is required that the comonomer content of the propylene polymer composition or the propylene copolymer (C-PP) is in the range of 4.0 to 8.0 wt. %, preferably in the range of 4.0 to 7.5 wt. %, more preferably in the range of 4.2 to 7.0 wt. %, still more preferably in the range of 4.3 to 6.8 wt. %.

Further the propylene polymer composition or the propylene copolymer (C-PP) preferably preferably has a melting temperature Tm of 148 to 162° C., more preferably in the range of 150 to 160° C.

Further it is preferred that the propylene polymer composition or the propylene copolymer (C-PP) has a crystallization temperature Tc of at least 115° C., more preferably in the range of 115 to 135° C. still more preferably in the range of 115 to 133° C., even still more preferably in the range of 115 to 130° C. These values are especially applicable in case the propylene copolymer (C-PP) is nucleated, e.g. α-nucleated.

Preferably, the propylene polymer composition or the propylene copolymer (C-PP) has a soluble fraction (SF), determined by CRYSTEC fractionation with CRYSTEX QC, Polymer Char (Valencia, Spain) as described below, of not more than 20 wt. %, more preferably in the range of 4.0 to 20.0 wt. %, even more preferably in the range of 6.0 to 18.0 wt. %, still more preferably in the range of 8.0 to 15.0 wt %. It is further preferred that the soluble fraction (SF) is at least 10 wt. %.

According to preferred embodiments, the propylene polymer composition or the propylene copolymer (C-PP) has an ethylene content of the soluble fraction ($C_2(SF)$), determined determined by CRYSTEC fractionation with CRYSTEX QC, Polymer Char (Valencia, Spain) as described below, in the range of from 10-25 wt %, more preferably 13-22 wt %, even more preferably 15-20 wt %.

According to preferred embodiments, the propylene polymer composition or the propylene copolymer (C-PP) has an ethylene content of the crystalline fraction ($C_2(CF)$), determined determined by CRYSTEC fractionation with CRYSTEX QC, Polymer Char (Valencia, Spain) as described below, in the range of from 1.5-4.1 wt %, more preferably 2.0-3.9 wt %, even more preferably 3.0-3.8 wt %

According to preferred embodiments, the propylene polymer composition or the propylene copolymer (C-PP) has a specific ratio between the ethylene content of the soluble fraction ($C_2(SF)$) and the ethylene content of the crystalline fraction ($C_2(CF)$). Said ratio $C_2(SF)/C_2(CF)$ may be 4.0 or higher, like 4.0-10, preferably 4.2-8.0, or more preferably 4.4 to 6.0.

According to preferred embodiments, the propylene polymer composition or the propylene copolymer (C-PP) has an intrinsic viscosity (IV), measured according to CRYSTEC fractionation with CRYSTEX QC, Polymer Char (Valencia, Spain) as described below in the range of 1.3-4.0 dl/g, like 2.1-3.2, preferably 2.5-2.7 dl/g.

It is further preferred that the propylene polymer composition or the propylene copolymer (C-PP) has an intrinsic viscosity of the soluble fraction (IV(SF)), measured according to CRYSTEC fractionation with CRYSTEX QC, Polymer Char (Valencia, Spain) as described below on the soluble fraction (SF) in the range of at least 1.3 dl/g or higher, such as in the range of 1.3-2.3 dl/g, preferably 1.5-2.1 dl/g or 1.7-2.0 dl/g.

It is further preferred that the propylene polymer composition or the propylene copolymer (C-PP) has an intrinsic viscosity of the crystalline fraction (IV(CF)), measured according to CRYSTEC fractionation with CRYSTEX QC, Polymer Char (Valencia, Spain) as described below on the crystalline fraction (CF) in the range of 1.8-4.5 dl/g, preferably 2.0-4.0, more preferably 2.2-3.3 dl/g, or 2.4-2.8 dl/g.

Preferably the propylene copolymer according to this invention has been produced in the presence of a Ziegler-Natta catalyst. The catalyst influences in particular the microstructure of the polymer. In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes which is not the case for polypropylenes made by Ziegler-Natta (ZN). A detailed description of the structure and mechanism of formation of regio-defects in polypropylene can be found in Chemical Reviews 2000,100 (4), pages 1316-1327.

The propylene copolymer (C-PP) preferably comprises at least two polymer fractions, like two or three polymer fractions, all of them being propylene copolymers. Preferably the propylene copolymer (C-PP) comprises at least two different propylene copolymer fractions, like two different propylene copolymer fractions, wherein further the two propylene copolymer fractions preferably differ in the comonomer content and/or in the melt flow rate.

Preferably one fraction of the two polymer copolymer fractions of the propylene copolymer (C-PP) is the comonomer lean fraction and the other fraction is the comonomer rich fraction.

In addition, one fraction of the two polymer copolymer fractions of the propylene copolymer (C-PP) is the low melt flow rate $MFR_2$ (230° C.) fraction and the other fraction is the high melt flow rate $MFR_2$ (230° C.) fraction.

Even more preferred the propylene copolymer (C-PP) comprises, preferably consists of, a first propylene copolymer fraction (PP1) and a second propylene copolymer fraction (PP2), wherein further the comonomer content of propylene copolymer fraction (PP1) is in the range of 0.5 to 2.6 wt.-% and the comonomer content of the propylene copolymer fraction (PP1) is lower compared to the comonomer content of the propylene copolymer fraction (PP2). In one embodiment the propylene copolymer fractions (PP1) and (PP2) differ in the melt flow rate $MFR_2$ (230° C.).

Thus in one embodiment the first propylene copolymer fraction (PP1) has a higher melt flow rate $MFR_2$ (230° C.) than the propylene copolymer fraction (PP2). [$1^{st}$ option]

In another embodiment the first propylene copolymer fraction (PP1) has a lower melt flow rate $MFR_2$ (230° C.) than the second propylene copolymer fraction (PP2). [$2^{nd}$ option]

In still another embodiment the second propylene copolymer fraction (PP2) has a higher comonomer content but a lower melt flow rate $MFR_2$ (230° C.) than the first propylene copolymer fraction (PP1). [3$^{rd}$ option]

In further embodiment the second propylene copolymer fraction (PP2) has a higher comonomer content and melt flow rate $MFR_2$ (230° C.) than the first propylene copolymer fraction (PP1) [4$^{th}$ option].

The embodiments according to the 3$^{rd}$ and 4$^{th}$ option are especially preferred.

It is further preferred that the melt flow rate $MFR_2$ (230° C.) of the first propylene copolymer fraction (PP1) to the melt flow rate $MFR_2$ (230° C.) of the propylene copolymer (C-PP) differ by no more than 6.0 g/10 min, more preferably by no more than 4.0 g/10 min, still more preferably by no more than 2.0 g/10 min.

It is preferred that the first propylene copolymer fraction (PP1) has a comonomer content of 0.5 to 2.5 wt. %, more preferably of 0.6 to 2.3 wt. %, still more preferably of 0.8 to 2.1 wt. %, yet more preferably of 1.0 to 2.0 wt. %.

Preferably the first propylene copolymer fraction (PP1) has a melt flow rate $MFR_2$ (230° C.) in the range of in the range of 0.5 to 10.0 g/10 min, more preferably in the range 1.0 to 9.0 g/10 min, still more preferably in the range of 1.5 to 6.0 g/10 min.

On the other hand the second propylene copolymer fraction (PP2) preferably has a comonomer content in the range of from 6 to 20 wt. %, more preferably in the range of from 7 to 18 wt. %, still more preferably in the range of from 8 to 15 wt. %.

Preferably the second propylene copolymer fraction (PP2) preferably has a melt flow rate $MFR_2$ (230° C.) in the range of 0.05 to 6.0 g/10 min, more preferably in the range of 0.1 to 5.0 g/10 min, still more preferably in the range of 0.2 to 3.0 g/10 min.

The comonomers of the first propylene copolymer fraction (PP1) and the second propylene copolymer fraction (PP2), respectively, copolymerizable with propylene are ethylene and/or $C_4$ to $C_{12}$ α-olefins, in particular ethylene and/or $C_4$ to $C_8$ α-olefins, e.g. 1-butene, 1-hexene and/or 1-octene. Preferably the first propylene copolymer fraction (PP1) and second propylene copolymer fraction (PP2), respectively, comprise, especially consist of, monomers copolymerizable with propylene from the group consisting of ethylene, 1-butene, 1-hexene and 1-octene. More specifically the first propylene copolymer fraction (PP1) and second propylene copolymer fraction (PP2), respectively, comprise—apart from propylene—units derivable from ethylene and/or 1-butene. In a preferred embodiment the first propylene copolymer fraction (PP1) and the second propylene copolymer fraction (PP2) comprise the same comonomers, i.e. ethylene only.

Preferably the weight ratio between the first propylene copolymer fraction (PP1) and the second propylene copolymer fraction (PP2) is 30/70 to 70/30, more preferably 35/65 to 65/35, still more preferably 40/60 to 60/40.

The propylene copolymer (C-PP) as defined in the instant invention may contain up to 5.0 wt.-% additives, like α-nucleating agents (NU) and antioxidants, as well as slip agents and antiblocking agents. Preferably the additive content (without α-nucleating agents) is below 3.0 wt.-%, like below 1.0 wt.-%.

Preferably the propylene copolymer (C-PP) comprises an α-nucleating agent (NU). Even more preferred the present invention is free of β-nucleating agents. The α-nucleating agent (NU) is preferably selected from the group consisting of (i) salts of monocarboxylic acids and polycarboxylic acids, e.g. sodium benzoate or aluminum tert-butylbenzoate, (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4-di(methylbenzylidene) sorbitol), or substituted nonitol-derivatives, such as 1,2,3-trideoxy-4,6:5,7-bis-0-[(4-propylphenyl)methylene]-nonitol, (iii) salts of diesters of phosphoric acid, e.g. sodium 2,2'-methylenebis (4, 6-di-tert-butylphenyl) phosphate or aluminum-hydroxy-bis[2,2'-methylene-bis(4,6-di-t-butyl-phenyl)phosphate], (iv) vinylcycloalkane polymer and vinylalkane polymer, and (v) mixtures thereof.

Such additives are generally commercially available and are described, for example, in "Plastic Additives Handbook", 5$^{th}$ edition, 2001 of Hans Zweifel.

Preferably the propylene copolymer (C-PP) contains up to 2.0 wt.-% of the α-nucleating agent (NU). In a preferred embodiment, the propylene copolymer (C-PP) contains not more than 6000 ppm, more preferably of 1 to 5000 ppm, more preferably of 5 to 4500 ppm of an α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3-trideoxy-4,6: 5,7-bis-0-[(4-propylphenyl)methylene]-nonitol, vinylcycloalkane polymer, vinylalkane polymer, and mixtures thereof.

Polymeric nucleating agents (NU) can either be incorporated by in-reactor nucleation (so-called BNT technology) or by the so called Masterbatch technology (compounding technology) as mentioned below.

In a preferred embodiment of the present invention, the polymeric nucleating agent is introduced into the propylene copolymer (C-PP) by means of a suitably modified catalyst, into the reactor (i.e. in-reactor nucleation) i.e. the catalyst to be used in catalysing the polymerisation of propylene copolymer (C-PP), is subjected to a polymerisation of a suitable monomer for the polymeric nucleating agent to produce first said polymeric nucleating agent. The catalyst is then introduced together with the obtained polymeric nucleating agent to the actual polymerisation step(s) of the propylene copolymer (C-PP).

In a particularly preferred embodiment of the present invention, the propylene polymer is prepared in the presence of such a modified catalyst to obtain said reactor made propylene copolymer (C-PP). With such modified catalyst, it is also possible to carry out the above-identified preferred polymerisation sequence for the preparation of in-situ blended multimodal, including bimodal, polypropylenes.

In case of applying in-reactor nucleation, the inventive composition comprises a propylene homopolymer received from a step of pre-polymerisation which is carried out before the polymerisation of the first fraction as defined above. More preferably, said fraction is a propylene homopolymer fraction.

Another embodiment, different to the above mentioned in-reactor blend, is a mechanical blend of a polymer with a nucleating agent, wherein the propylene copolymer (C-PP) is first produced in the absence of a polymeric nucleating agent and is then blended mechanically with the polymeric nucleating agent or with a small amount of nucleated polymer or with polymers, which already contain the polymeric nucleating agent (so-called master batch technology) in order to introduce the polymeric nucleating agent into the polymer mixture. The preparation of a reactor made polymer composition ensures the preparation of a homogenous mixture of the components, for example a homogenously distributed polymeric nucleating agent in the polypropylene homopolymer, even at high concentrations of polymer nucleating agent.

As outlined above, the reactor made polymer composition is a preferred embodiment of the present invention, although also mechanical blends prepared, for example, by using master batch technology are envisaged by the present invention.

The haze and the clarity are determined according to ASTM D 1003-07 on a test specimen cut from a bottle having a wall thickness of 0.6 mm made from the propylene polymer composition.

Haze may be in the range of 35% or lower, like 5-35%, preferably 10-30%, more preferably in the range of 15-25%.

Clarity may be in the range of 75% or higher, such as 75-99%, preferably 77-90%, or 78.0-85.0%

The propylene copolymer (C-PP) according to this invention is preferably produced in a sequential polymerization process in the presence of a Ziegler-Natta catalyst as defined below.

Accordingly it is preferred that the propylene copolymer (C-PP) is produced in the presence of
(a) a Ziegler-Natta catalyst (ZN-C) comprises a titanium compound (TC), a magnesium compound (MC) and an internal donor (ID), wherein said internal donor (ID) is a non-phthalic acid ester,
(b) optionally a co-catalyst (Co), and
(c) optionally an external donor (ED).

Preferably the propylene copolymer (C-PP) is produced in a sequential polymerization process comprising at least two reactors (R1) and (R2), in the first reactor (R1) the first propylene copolymer fraction (PP1) is produced and subsequently transferred into the second reactor (R2), in the second reactor (R2) the second propylene copolymer fraction (PP2) is produced in the presence of the first propylene copolymer fraction (PP1).

The term "sequential polymerization system" indicates that the propylene copolymer (C-PP) is produced in at least two reactors connected in series. Accordingly the present polymerization system comprises at least a first polymerization reactor (R1) and a second polymerization reactor (R2), and optionally a third polymerization reactor (R3). The term "polymerization reactor" shall indicate that the main polymerization takes place. Thus in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR). Accordingly the average concentration of propylene copolymer (C-PP), i.e. the first fraction ($1^{st}$ F) of the propylene copolymer (C-PP) (i.e. the first propylene copolymer fraction (PP1)), in the polymer slurry within the loop reactor (LR) is typically from 15 wt.-% to 55 wt.-%, based on the total weight of the polymer slurry within the loop reactor (LR). In one preferred embodiment of the present invention the average concentration of the first propylene copolymer fraction (PP1) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably the propylene copolymer of the first polymerization reactor (R1), i.e. the first propylene copolymer fraction (PP1), more preferably the polymer slurry of the loop reactor (LR) containing the first propylene copolymer fraction (PP1), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the the first propylene copolymer fraction (PP1), is led directly to the next stage gas phase reactor.

Alternatively, the propylene copolymer of the first polymerization reactor (R1), i.e. the first propylene copolymer fraction (PP1), more preferably polymer slurry of the loop reactor (LR) containing the first propylene copolymer fraction (PP1), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors.

Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly for the instant process at least two, preferably two polymerization reactors (R1) and (R2) or three polymerization reactors (R1), (R2) and (R3), namely a slurry reactor (SR), like loop reactor (LR) and a (first) gas phase reactor (GPR1) and optionally a second gas phase reactor (GPR2), connected in series are used. If needed prior to the slurry reactor (SR) a pre-polymerization reactor is placed.

It is especially preferred that in the first polymerization reactor (R1), e.g. in the slurry reactor (SR), like loop reactor (LR), the first propylene copolymer fraction (PP1) and in the second polymerization reactor (R2), e.g. in the first gas phase reactors (GPR1), the second propylene copolymer fraction (PP2) is produced.

The Ziegler-Natta catalyst (ZN-C) is fed into the first polymerization reactor (R1) and is transferred with the polymer (slurry) obtained in the first polymerization reactor (R1) into the subsequent reactors. If the process covers also a pre-polymerization step it is preferred that all of the Ziegler-Natta catalyst (ZN-C) is fed in the pre-polymerization reactor.

Subsequently the pre-polymerization product containing the Ziegler-Natta catalyst (ZN-C) is transferred into the first polymerization reactor (R1).

Prior to the first reactor, preferably slurry reactor (SR) a pre-polymerization reactor (PPR) may be placed. Thus, the process may comprise a pre-polymerization step in which the above defined polymeric nucleating agent, preferably the vinyl compound according to formula (I) as defined above, even more preferably vinyl cyclohexane (VCH), may first be polymerized in the presence of a catalyst system, comprising a solid Ziegler Natta catalyst component, a cocatalyst and optional external donor, according to the so-called BNT-technology.

The so obtained reaction mixture of the polymer of the vinyl compound according to formula (I) as defined above, even more preferably vinyl cyclohexane (VCH) polymer and the catalyst system is then introduced in the first polymerization reactor (R1).

The weight ratio of vinyl compound to polymerization catalyst in the modification step of the polymerization catalyst preferably is 0.3 or more up to 40, such as 0.4 to 20 or more preferably 0.5 to 15, like 0.5 to 2.0.

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oilgrease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds preferably contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess. Further, the reaction time of the catalyst modification by polymerization of a vinyl compound should be sufficient to allow for complete reaction of the vinyl monomer, i. e. the polymerization is continued until the amount of unreacted vinyl compounds in the reaction mixture (including the polymerization medium and the reactants) is less than 0.5 wt-%, in particular less than 2000 ppm by weight (shown by analysis). Thus, when the pre-polymerized catalyst contains a maximum of about 0.1 wt-% vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least I hour and in particular at least 5 hours. Polymerization times even in the range of 6 to 50 hours can be used. The modification can be done at temperatures of 10 to 70° C., preferably 35 to 65° C.

In preferred embodiments, all of the Ziegler-Natta catalyst (ZN-C) is fed in the pre-polymerization reactor. Subsequently the pre-polymerization product containing the modified Ziegler-Natta catalyst (ZN-C) is transferred into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and optional in the third reactor (R3) is in the range of 75 to 95° C., more preferably in the range of 78 to 92° C.

Preferably the operating temperature in the second polymerization reactor (R2) is equal or higher to the operating temperature in the first polymerization reactor (R1). Accordingly it is preferred that the operating temperature (a) in the first polymerization reactor (R1) is in the range of 62 to 85° C., more preferably in the range of 65 to 82° C., still more preferably in the range of 67 to 80° C., and (b) in the second polymerization reactor (R2) is in the range of 75 to 95° C., more preferably in the range of 78 to 92° C., still more preferably in the range of 78 to 88° C., with the proviso that the operating temperature in the in the second polymerization reactor (R2) is equal or higher to the operating temperature in the first polymerization reactor (R1).

Still more preferably the operating temperature of the third polymerization reactor (R3)—if present—is higher than the operating temperature in the first polymerization reactor (R1). In one specific embodiment the operating temperature of the third polymerization reactor (R3)—if present—is higher than the operating temperature in the first polymerization reactor (R1) and in the second polymerization reactor (R2). Accordingly it is preferred that the operating temperature (a) in the first polymerization reactor (R1) is in the range of 62 to 85° C., more preferably in the range of 65 to 82° C., still more preferably in the range of 67 to 80° C., (b) in the second polymerization reactor (R2) is in the range of 75 to 95° C., more preferably in the range of 78 to 92° C., still more preferably in the range of 78 to 88° C., and (c) in the third polymerization reactor (R3)—if present—is in the range of 75 to 95° C., more preferably in the range of 78 to 92° C., still more preferably in the range of 85 to 92° C., like in the range of 87 to 92° C., with the proviso that the operating temperature in the in the second polymerization reactor (R2) is equal or higher to the operating temperature in the first polymerization reactor (R1) and with the proviso that the third polymerization reactor (R3) is higher than the operating temperature in the first polymerization reactor (R1), preferably is higher than the operating temperature in the first polymerization reactor (R1) and in the second polymerization reactor (R2).

Typically the pressure in the first polymerization reactor (R1), preferably in the loop reactor (LR), is in the range of from 20 to 80 bar, preferably 30 to 70 bar, like 35 to 65 bar, whereas the pressure in the second polymerization reactor (R2), i.e. in the (first) gas phase reactor (GPR1), and optionally in any subsequent reactor, like in the third polymerization reactor (R3), e.g. in the second gas phase reactor (GPR2), is in the range of from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume ($V_R$) to the volumetric outflow rate from the reactor ($Q_O$) (i.e. $V_R/Q_O$), i.e $\tau=V_R/Q_O$[tau=$V_R/Q_O$]. In case of a loop reactor the reaction volume ($V_R$) equals to the reactor volume.

Accordingly the average residence time ($\tau$) in the first polymerization reactor (R1) is preferably at least 15 min, more preferably in the range of 16 to 90 min, still more preferably in the range of 20 to 60 min, like in the range of 22 to 40 min, and/or the average residence time ($\tau$) in the second polymerization reactor (R2) is preferably at least 90 min, more preferably in the range of 90 to 300 min, still more preferably in the range of 100 to 280 min, yet more preferably in the range of 110 to 260 min. Preferably the average residence time ($\tau$) in the third polymerization reactor (R3)—if present—is preferably at least 30 min, more preferably in the range of 30 to 120 min, still more preferably in the range of 40 to 100 min, like in the range of 50 to 90 min.

Further it is preferred that the average residence time ($\tau$) in the total sequential polymerization system, more preferably that the average residence time ($\tau$) in the first (R1) second polymerization reactors (R2) and optional third polymerization reactor (R3) together, is at least 120 min, more preferably at least 140 min, still more preferably in the range of 140 to 400 min, more preferably in the range of 145 to 260 min.

As mentioned above the instant process can comprises in addition to the (main) polymerization of the propylene copolymer (C-PP) in the at least two polymerization reactors (RI, R3 and optional R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 18 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C) and the polypropylene (Pre-PP) produced in the pre-polymerization reactor (PR) is transferred to the first reactor (R1I) and thus is being part of the first propylene copolymer fraction (PP1). Accordingly the properties of the first propylene copolymer fraction (PP1) defined above are actually the result of the polymer produced in the first reactor (R1) and the polypropylene (Pre-PP).

However as typically the total amount of the polypropylene (Pre-PP) in the final propylene copolymer (C-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%, the properties of the first propylene copolymer fraction (PP1) are not essentially influenced by the presence of the polypropylene (Pre-PP).

In case that pre-polymerization is not used propylene and the other ingredients such as the Ziegler-Natta catalyst (ZN-C) are directly introduced into the first polymerization reactor (R1).

Accordingly the process according the instant invention comprises the following steps under the conditions set out above
(a) in the first polymerization reactor (R1), i.e. in a loop reactor (LR), propylene and a comonomer being ethylene and/or a $C_4$ to $C_{12}$ a-olefin, preferably propylene and ethylene, are polymerized obtaining a first propylene copolymer fraction (PP1) of the propylene copolymer (C-PP),
(b) transferring said first propylene copolymer fraction (PP1) to a second polymerization reactor (R2),
(c) in the second polymerization reactor (R2) propylene and a comonomer being ethylene and/or a $C_4$ to $C_{12}$ a-olefin, preferably propylene and ethylene, are polymerized in the presence of the first propylene copolymer fraction (PP1) obtaining a second propylene copolymer fraction (PP2) of the propylene copolymer (C-PP), said first propylene copolymer fraction (PP1) and said second propylene copolymer fraction (PP2) form the propylene copolymer (C-PP).

A pre-polymerization as described above can be accomplished prior to step (a).

The Ziegler-Natta Catalyst (ZN-C), the external donor (ED) and the co-catalyst (Co)

As pointed out above in the specific process for the preparation of the propylene copolymer (C-PP) as defined above a Ziegler-Natta catalyst (ZN-C) must be used. Accordingly the Ziegler-Natta catalyst (ZN-C) will be now described in more detail.

The catalyst used in the present invention is a solid Ziegler-Natta catalyst (ZN-C), which comprises a titanium compound (TC), a magnesium compound (MC) and an internal donor (ID), wherein said internal donor (ID) is a non-phthalic acid ester, most preferably diester of non-phthalic dicarboxylic acids as described in more detail below. Thus, the catalyst used in the present invention is fully free of undesired phthalic compounds.

The Ziegler-Natta catalyst (ZN-C) can be further defined by the way as obtained.

Accordingly the Ziegler-Natta catalyst (ZN-C) is preferably obtained by a process comprising the steps of
a) providing a solution of at least one complex (A) being a complex of a magnesium compound (MC) and an alcohol comprising in addition to the hydroxyl moiety at least one further oxygen bearing moiety (A1) being different to a hydroxyl group, and optionally at least one complex (B) being a complex of said magnesium compound (MC) and an alcohol not comprising any other oxygen bearing moiety (B1),
b) combining said solution with a titanium compound (TC) and producing an emulsion the dispersed phase of which contains more than 50 mol.-% of the magnesium; c) agitating the emulsion in order to maintain the droplets of said dispersed phase preferably within an average size range of 5 to 200 µm;
d) solidifying said droplets of the dispersed phase;
e) recovering the solidified particles of the olefin polymerisation catalyst component, and wherein an internal donor (ID) is added at any step prior to step c) and said internal donor (ID) is non-phthalic acid ester, preferably said internal donor (ID) is a diester of non-phthalic dicarboxylic acids as described in more detail below.

Detailed description as to how such a Ziegler-Natta catalyst (ZN-C) can be obtained is disclosed in WO 2012/007430.

In a preferred embodiment in step a) the solution of complex of magnesium compound (MC) is a mixture of complexes of magnesium compound (MC) (complexes (A) and (B)).

The complexes of magnesium compound (MC) (complexes (A) and (B)) can be prepared in situ in the first step of the catalyst preparation process by reacting said magnesium compound (MC) with the alcohol(s) as described above and in more detail below, or said complexes can be separately prepared complexes, or they can be even commercially available as ready complexes and used as such in the catalyst preparation process of the invention. In case the mixture of complexes of magnesium compound (MC) (complexes (A) and (B)) are prepared in situ in the first step of the catalyst preparation process they are preferably prepared by reacting said magnesium compound (MC) with the mixture of alcohols (A1) and (B1).

Preferably, the alcohol (A1) comprising in addition to the hydroxyl moiety at least one further oxygen bearing group different to a hydroxyl group to be employed in accordance with the present invention is an alcohol bearing an ether group.

Illustrative examples of such preferred alcohols (A1) comprising in addition to the hydroxyl moiety at least one further oxygen bearing group to be employed in accordance with the present invention are glycol monoethers, in particular $C_2$ to $C_4$ glycol monoethers, such as ethylene or propylene glycol monoethers wherein the ether moieties comprise from 2 to 18 carbon atoms, preferably from 4 to 12 carbon atoms. Preferred monoethers are $C_2$ to $C_4$ glycol monoethers and derivatives thereof. Illustrative and preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

In case a mixture of complexes (A) and (B) (or alcohols (A1) and (B1) respectively) are used, the different complexes or alcohols are usually employed in a mole ratio of A:B, or A1:B1 from 1.0:10 to 1.0:0.5, preferably this mole ratio is from 1.0:8.0 to 1.0:1.0, more preferably 1.0:6.0 to 1.0:2.0, even more preferably 1.0:5.0 to 1.0:3.0. As indicated in the ratios above it is more preferred that the amount of alcohol A1, preferably alcohol with ether moiety, is higher that alcohol B1, i.e. alcohol without any other oxygen bearing moiety different to hydroxyl.

The internal donor (ID) used in the preparation of the Ziegler-Natta catalyst (ZN-C) is preferably selected from (di)esters of non-phthalic carboxylic (di)acids and derivatives and mixtures thereof. The ester moieties, i.e. the moieties derived from an alcohol (i.e. the alkoxy group of the ester), may be identical or different, preferably these ester moieties are identical. Typically the ester moieties are aliphatic or aromatic hydrocarbon groups. Preferred examples thereof are linear or branched aliphatic groups having from 1 to 20 carbon atoms, preferably 2 to 16 carbon atoms, more preferably from 2 to 12 carbon atoms, or aromatic groups having 6 to 12 carbon atoms, optionally containing heteroatoms of Groups 14 to 17 of the Periodic Table of IUPAC, especially N, O, S and/or P. The acid moiety of the di- or monoacid(di)ester, preferably of the diester of diacid, preferably comprises 1 to 30 carbon atoms, more preferably, 2 to 20 carbon atoms, still more preferably 2 to 16 carbon atoms, optionally being substituted by aromatic or saturated or non-saturated cyclic or aliphatic hydrocarbyls having 1 to 20 C, preferably 1 to 10 carbon atoms and optionally containing heteroatoms of Groups 14 to 17 of the Periodic Table of IUPAC, especially N, O, S and/or P. Especially preferred esters are diesters of mono-unsaturated dicarboxylic acids.

In particular preferred esters are esters belonging to a group comprising malonates, maleates, succinates, glutarates, cyclohexene-1,2-dicarboxylates and benzoates, optionally being substituted as defined below, and any derivatives and/or mixtures thereof. Preferred examples are e.g. substituted maleates and citraconates, most preferably citraconates.

The internal donor (ID) or precursor thereof as defined further below is added preferably in step a) to said solution.

Esters used as internal donors (ID) can be prepared as is well known in the art. As example dicarboxylic acid diesters can be formed by simply reacting of a carboxylic diacid anhydride with a $C_i$-$C_{20}$ alkanol and/or diol.

The titanium compound (TC) is preferably a titanium halide, like $TiCl_4$.

The complexes of magnesium compounds can be alkoxy magnesium complexes, preferably selected from the group consisting of magnesium dialkoxides, and complexes of a magnesium dihalide and a magnesium dialkoxide. It may be a reaction product of an alcohol and a magnesium compound selected from the group consisting of dialkyl magnesiums, alkyl magnesium alkoxides and alkyl magnesium halides, preferably dialkyl magnesium. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a dialkyl magnesium of the formula R^Mg, wherein each one of the two Rs is a similar or different $C_1$-$C_{20}$ alkyl, preferably a similar or different $C_2$-$C_{10}$ alkyl with alcohols as defined in the present application. Typical magnesium alkyls are ethylbutyl magnesium, dibutyl magnesium, dipropyl magnesium, propylbutyl magnesium, dipentyl magnesium, butylpentyl magnesium, butyloctyl magnesium and dioctyl magnesium. Most preferably, one R of the formula $R_2Mg$ is a butyl group and the other R is an octyl or ethyl group, i.e. the dialkyl magnesium compound is butyl octyl magnesium or butyl ethyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium or alkyl magnesium alkoxide can react, in addition to the alcohol containing in addition to the hydroxyl group at least one further oxygen bearing moiety being different to a hydroxyl moiety, which is defined above in this application, with a monohydric alcohol R'OH, or a mixture thereof with a polyhydric alcohol $R'(OH)_m$.

Preferred monohydric alcohols are alcohols of the formula $R^b(OH)$, wherein $R^b$ is a $C_1$-$C_{20}$, preferably a $C_4$-$C_{12}$ and most preferably a $C_6$-$C_{10}$, straight-chain or branched alkyl residue or a $C_6$-$C_{12}$ aryl residue. Preferred monohydric alcohols include methanol, ethanol, n-propanol, iso-propanol, n-butanol, iso-butanol, sec-butanol, tert-butanol, n-amyl alcohol, iso-amyl alcohol, sec-amyl alcohol, tert-amyl alcohol, diethyl carbinol, sec-isoamyl alcohol, tert-butyl carbinol, 1-hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol, 1-undecanol, 1-dodecanol, 1-tridecanol, 1-tetradecanol, 1-pentadecanol, 1-hexadecanol, 1-heptadecanol 1-octadecanol and phenol or benzyl alcohol. The aliphatic monohydric alcohols may optionally be unsaturated, as long as they do not act as catalyst poisons. The most preferred monohydric alcohol is 2-ethyl-1-hexanol.

Preferred polyhydric alcohols are alcohols of the formula $R^a(OH)_m$, wherein $R^a$ is a straight-chain, cyclic or branched $C_2$ to $C_6$ hydrocarbon residue, (OH) denotes hydroxyl moieties of the hydrocarbon residue and m is an integer of 2 to 6, preferably 3 to 5. Especially preferred polyhydric alcohols include ethylene glycol, propylene glycol, trimethylene glycol, 1,2-butylene glycol, 1,3-butylene glycol, 1,4-butylene glycol, 2,3-butylene glycol, 1,5pentanediol, 1,6-hexanediol, 1,8-octanediol, pinacol, diethylene glycol, triethylene glycol, 1,2-catechol, 1,3-catechol and 1,4-catechol, and triols such as glycerol and pentaerythritol.

The solvents to be employed for the preparation of the Ziegler-Natta catalyst (ZN-C) may be selected among aromatic and aliphatic solvents or mixtures thereof. Preferably the solvents are aromatic and/or aliphatic hydrocarbons with 5 to 20 carbon atoms, preferably 5 to 16, more preferably 5 to 12 carbon atoms, examples of which include benzene, toluene, cumene, xylol and the like, with toluene being preferred, as well as pentane, hexane, heptane, octane and nonane including straight chain, branched and cyclic compounds, and the like, with hexanes and heptanes being particular preferred.

Mg compound (MC) is typically provided as a 10 to 50 wt-% solution in a solvent as indicated above. Typical commercially available MC solutions are 20-40 wt-% solutions in toluene or heptanes.

The reaction for the preparation of the complex of magnesium compound (MC) may be carried out at a temperature of 40° to 70° C.

In step b) the solution of step a) is typically added to the titanium compound (TC), such as titanium tetrachloride. This addition preferably is carried out at a low temperature, such as from −10 to 40° C., preferably from −5 to 20° C., such as about −5° C. to 15° C.

The temperature for steps b) and c), is typically −10 to 50° C., preferably from −5 to 30° C., while solidification typically requires heating as described in detail further below.

The emulsion, i.e. the two phase liquid-liquid system may be formed in all embodiments of the present invention by simple stirring and optionally adding (further) solvent(s) and additives, such as the turbulence minimizing agent (TMA) and/or the emulsifying agents described further below.

Preparation of the Ziegler-Natta catalyst (ZN-C) used in the present invention is based on a liquid/liquid two-phase system where no separate external carrier materials such as silica or $MgCl_2$ are needed in order to get solid catalyst particles.

The present Ziegler-Natta catalyst (ZN-C) particles are spherical and they have preferably a mean particle size from 5 to 500 μm, such as from 5 to 300 μm and in embodiments from 5 to 200 μm, or even from 10 to 100 μm. These ranges also apply for the droplets of the dispersed phase of the emulsion as described herein, taking into consideration that the droplet size can change (decrease) during the solidification step.

The process of the preparation of the Ziegler-Natta catalyst (ZN-C) as intermediate stage, yields to an emulsion of a denser, titanium compound (TC)/toluene-insoluble, oil dispersed phase typically having a titanium compound (TC)/magnesium mol ratio of 0.1 to 10 and an oil disperse phase having a titanium compound (TC)/magnesium mol ratio of 10 to 100. The titanium compound (TC) is preferably TiCl$_4$. This emulsion is then typically agitated, optionally in the presence of an emulsion stabilizer and/or a turbulence minimizing agent, in order to maintain the droplets of said dispersed phase, typically within an average size range of 5 to 200 μm. The catalyst particles are obtained after solidifying said particles of the dispersed phase e.g. by heating.

In effect, therefore, virtually the entirety of the reaction product of the Mg complex with the titanium compound (TC)—which is the precursor of the ultimate catalyst component—becomes the dispersed phase, and proceeds through the further processing steps to the final particulate form. The disperse phase, still containing a useful quantity of titanium compound (TC), can be reprocessed for recovery of that metal.

Furthermore, emulsifying agents/emulsion stabilizers can be used additionally in a manner known in the art for facilitating the formation and/or stability of the emulsion. For the said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched C$_{12}$ to C$_{20}$ (meth)acrylates such as poly(hexadecyl)-methacrylate and poly(octadecyl)-methacrylate.

Furthermore, in some embodiments a turbulence minimizing agent (TMA) can be added to the reaction mixture in order to improve the emulsion formation and maintain the emulsion structure. Said TMA agent has to be inert and soluble in the reaction mixture under the reaction conditions, which means that polymers without polar groups are preferred, like polymers having linear or branched aliphatic carbon backbone chains. Said TMA is in particular preferably selected from a-olefin polymers of a-olefin monomers with 6 to 20 carbon atoms, like polyoctene, polynonene, polydecene, polyundecene or polydodecene or mixtures thereof. Most preferable it is polydecene.

TMA can be added to the emulsion in an amount of e.g. 1 to 1.000 ppm, preferably 5 to 100 ppm and more preferable 5 to 50 ppm, based on the total weight of the reaction mixture.

It has been found that the best results are obtained when the titanium compound (TC)/Mg mol ratio of the dispersed phase (denser oil) is 1 to 5, preferably 2 to 4, and that of the disperse phase oil is 55 to 65. Generally the ratio of the mol ratio titanium compound (TC)/Mg in the disperse phase oil to that in the denser oil is at least 10.

Solidification of the dispersed phase droplets by heating is suitably carried out at a temperature of 70 to 150° C., usually at 80 to 110° C., preferably at 90 to 110° C. The heating may be done faster or slower. As especial slow heating is understood here heating with a heating rate of about 5° C./min or less, and especial fast heating e.g. 10° C./min or more. Often slower heating rates are preferable for obtaining good morphology of the catalyst component.

The solidified particulate product may be washed at least once, preferably at least twice, most preferably at least three times with a hydrocarbon, which preferably is selected from aromatic and aliphatic hydrocarbons, preferably with toluene, heptane or pentane. Washings can be done with hot (e.g. 90° C.) or cold (room temperature) hydrocarbons or combinations thereof.

Finally, the washed Ziegler-Natta catalyst (ZN-C) is recovered. It can further be dried, as by evaporation or flushing with nitrogen, or it can be slurried to an oily liquid without any drying step.

The finally obtained Ziegler-Natta catalyst (ZN-C) is desirably in the form of particles having generally an average size range of 5 to 200 μm, preferably 10 to 100 μm, even an average size range of 20 to 60 μm is possible.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

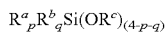

wherein R$^a$, R$^b$ and R$^c$ denote a hydrocarbon radical, in particular an alkyl or cycloalkyl group, and wherein p and q are numbers ranging from 0 to 3 with their sum p+q being equal to or less than 3. R$^a$, R$^b$ and R$^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula

wherein R$^3$ and R$^4$ can be the same or different a represent a hydrocarbon group having 1 to 12 carbon atoms.

R$^3$ and R$^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^3$ and R$^4$ are independently selected from the group consisting of methyl, ethyl, n-propyl, n-butyl, octyl, decanyl, iso-propyl, iso-butyl, iso-pentyl, tert.-butyl, tert-amyl, neopentyl, cyclopentyl, cyclohexyl, methylcyclopentyl and cycloheptyl.

More preferably both R$^1$ and R$^2$ are the same, yet more preferably both R$^3$ and R$^4$ are an ethyl group.

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as AlH$_3$, of less than 1.0 wt % with respect to the triethyl aluminium (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 3 to 45, preferably is in the range of 4 to 35, more preferably is in the range of 4.5 to 25; and optionally
(b) the mol-ratio of co-catalyst (Co) to titanium compound (TC) [Co/TC] must be in the range of above 50 to 500, preferably is in the range of 80 to 400, still more preferably is in the range of 100 to 350.

The additives as stated above are added to the propylene copolymer (C-PP) preferably by extruding. For mixing/extruding, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then further processed, e.g. by an extrusion blow molding process as described below.

Extrusion Blow Molded (EBM) Article

The propylene polymer composition of present invention is especially suitable for the production of an extrusion blow molded article comprising the propylene copolymer (C-PP).

Extrusion blow molded articles differ essentially from injection blow molded articles and injection stretch blow molded articles. For instance extrusion blow molded article differ from injection blow molded articles and injection stretch blow molded articles in at least one of the properties selected from the group consisting of surface appearance, impact behavior, emissions, amount of volatiles and hexane extractables, to mention a few.

Accordingly the present invention is directed to an extrusion blow molded article comprising, preferably comprising at least 75 wt.-%, more preferably comprising at least 80 wt.-%, still more preferably comprising at least 90 wt.-%, yet more preferably comprising at least 95 wt.-%, still yet more preferably comprising at least 99 wt.-%, like consisting of, the propylene copolymer (C-PP) as defined above.

Accordingly as the propylene copolymer (C-PP) is the main component in the extrusion blow molded article, the extrusion blow molded article has preferably the same properties as the propylene copolymer (C-PP). Accordingly all properties mentioned for the propylene copolymer (C-PP) are equally applicable for the extrusion blow molded article. This applies in particular, but not only, for the melt flow rate $MFR_2$ (230° C.), the comonomer content, the DSC properties, like melting temperature, the intrinsic viscosity (IV), the soluble fraction (SF) and the crystalline fraction (CF).

Preferably the extrusion blow molded articles are bottles or containers, preferably bottles for household or industrial chemicals, for cosmetics, for pharmaceutical packaging or for food and drinks. Even more preferred the bottles have a dimensions of up to 10 l, preferably 100 ml to 5 l, like 200 ml to 2 l, and/or a wall thickness of 0.1 to 1.2 mm, like 0.2 to 0.8 mm.

The preparation of extrusion blow molded articles is well known in the art and for instance described in "Propylene handbook", Nello Pasquinin (Ed.), $2^{nd}$ edition (2005), page 445, Hanser.

In extrusion blow molding (EBM), the polymer is melted and extruded into a hollow tube (a parison). This parison is then captured by closing it into a cooled forming mold. Compressed air is then blown into the parison, inflating it into the shape of the hollow bottle, container, or part. After the polymer has cooled sufficiently, the mold is opened and the part is ejected.

Use of the Propylene Copolymer (C-PP)

The present invention is also directed to the use of the propylene polymer composition for the manufacture of an extrusion blow molded article. The present invention is in particular directed to the use of the propylene polymer composition and the propylene copolymer (C-PP) as defined above to improve the optical properties of an extrusion blow molded article, like an extrusion blow molded bottle, comprising, preferably comprising at least 75 wt.-%, more preferably comprising at least 80 wt.-%, still more preferably comprising at least 90 wt.-%, yet more preferably comprising at least 95 wt.-%, still yet more preferably comprising at least 99 wt.-%, like consisting of, said propylene polymer composition or propylene copolymer (C-PP) by keeping the impact properties, especially expressed by the drop height, on a high level.

The improvement is especially accomplished when the extrusion blow molded article, like the extrusion blow molded bottle, comprising, preferably comprising at least 70 wt.-%, more preferably comprising at least 80 wt.-%, still more preferably comprising at least 90 wt.-%, yet more preferably comprising at least 95 wt-%, still yet more preferably comprising at least 99 wt.-%, of said propylene polymer composition, preferably consisting of said propylene copolymer (C-PP).

Measurement Methods (a) Crystalline and Soluble Fractions Method

The crystalline (CF) and soluble fractions (SF) of the polypropylene (PP) compositions as well as the comonomer content and intrinsic viscosities of the respective fractions were analysed by the CRYSTEX QC, Polymer Char (Valencia, Spain).

The crystalline and amorphous fractions are separated through temperature cycles of dissolution at 160° C., crystallization at 40° C. and re-dissolution in 1,2,4-trichlorobenzene (1,2,4-TCB) at 160° C. Quantification of SF and CF and determination of ethylene content ($C_2$) are achieved by means of an infrared detector (IR4) and an online 2-capillary viscometer which is used for the determination of the intrinsic viscosity (IV).

The IR4 detector is a multiple wavelength detector detecting IR absorbance at two different bands ($CH_3$ and $CH_2$) for the determination of the concentration and the Ethylene content in Ethylene-Propylene copolymers. IR4 detector is calibrated with series of 8 EP copolymers with known Ethylene content in the range of 2 wt. % to 69 wt. % (determined by $^{13}$C-NMR) and various concentration between 2 and 13 mg/ml for each ethylene/propylene copolymer used for calibration.

The amount of the soluble fraction (SF) and the crystalline fraction (CF) are correlated through the XS calibration to the xylene cold soluble" (XCS) quantity and respectively xylene cold insoluble (XCI) fractions, determined according to standard gravimetric method as per ISO16152. XS calibration is achieved by testing various ethylene/propylene copolymers with xylene soluble content in the range 2-31 wt. %.

The intrinsic viscosity (IV) of the parent ethylene/propylene copolymer and its soluble and crystalline fractions are determined with a use of an online 2-capillary viscometer and are correlated to corresponding intrinsic viscosities, determined according to DIN ISO 1628/1, October 1999 in decalin at 135° C. Calibration is achieved with various ethylene/propylene and propylene copolymers with IV=2-4 dl/g.

A sample of the propylene copolymer composition to be analysed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

A defined volume of the sample solution is injected into the column filled with inert support where the crystallization of the sample and separation of the soluble fraction from the crystalline part occurs. This process is repeated two times. During the first injection the whole sample is measured at high temperature, determining the intrinsic viscosity [dl/g] and the ethylene content ($C_2$) [wt %] of the propylene copolymer composition. During the second injection the soluble fraction (at 40° C.) and the crystalline fraction (at 160° C.) with the crystallization cycle are measured (wt. % SF, wt. % $C_2$, IV).

(b) Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1 128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950).

With characteristic signals corresponding to 2,1 erythro region-defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1 157), the correction for the influence of the regio-defects on determined properties was required. Characteristic signals corresponding to other types of region-defects were not observed.

The comonomer fraction was quantified using the method of Wang et. al. (Wang, W. J., Zhu, S., Macromolecules 33 (2000), 1 157) through integration of multiple signals across the whole spectral region in the $^{13}C$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$E = 0.5(S\beta\beta + S\beta\gamma + S\beta\delta + 0.5(S\alpha\beta + S\alpha\gamma))$ Through the use of this set of sites the corresponding integral equation becomes:

$E = 0.5(I_H + I_G + 0.5(I_C + I_D))$ using the same notation used in the article of Wang et. al. (Wang, W.-J., Zhu, S., Macromolecules 33 (2000), 1 157). Equations used for absolute propylene content were not modified.

The mole percent comonomer incorporation was calculated from the mole fraction:

$E$ [mol %] = $100 * fE$

The weight percent comonomer incorporation was calculated from the mole fraction:

$E$ [wt %] = $100*(fE*28.06)/((fE*28.06) + ((1-fE)*42.08))$

The comonomer sequence distribution at the triad level was determined using the analysis method of Kakugo et al. (Kakugo, M., Naito, Y., Mizunuma, K., Miyatake, T. Macromolecules 15 (1982) 1 150). This method was chosen for its robust nature and integration regions slightly adjusted to increase applicability to a wider range of comonomer contents.

(c) DSC Analysis, Melting Temperature ($T_m$) and Crystallization Temperature ($T_c$)

DSC analysis was measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature is determined from the cooling step, while melting temperature is determined from the second heating step.

(d) Clarity and Haze Measurement on Bottles

Description/Dimension and Production of the Bottles 1 l bottles, having an outer diameter of 90 mm, a wall thickness of 0.6 mm, an overall-height of 204 mm and a height of the cylindrical mantle of 185 mm were produced by extrusion blow moulding on a B&W machine with a single screw extruder using a melt temperature of 210° C. and a mould temperature of 15° C.

Instrument: Haze-gard plus from BYK-Gardner

Testing: according to ASTM D1003 (as for injection molded plates)

Method: The measurement is done on the outer wall of the bottles. The top and bottom of the bottles are cut off. The resulting round wall is then split in two, horizontally. Then from this wall six equal samples of app. 60×60 mm are cut from close to the middle.

The specimens are placed into the instrument with their convex side facing the haze port. Then the transparency, haze and clarity are measured for each of the six samples and the haze value is reported as the average of these six parallels.

Drop Test on Bottles (Progressive)

During the progressive drop test each bottle as defined above is dropped several times in a row from increasing heights. The test is stopped for each bottle when fracture occurs.

The drop test is performed on the extrusion blow moulded 1 l bottles as described before. The bottles are filled up to their shoulder with water.

For each test series at least 12 bottles are required. 4 bottles are dropped simultaneously from a starting height which is chosen according to the following table, where the expected fracture drop height has been determined in pre-tests or has been chosen from experience:

| Expected fracture drop height [m] | 0.3-1.0 | 1.0-2.5 | 2.5-5.0 |
|---|---|---|---|
| Starting drop height [m] | 0.2 | 0.5 | 2.0 |

Those bottles that show fracture are discarded and the test is continued with the remaining bottles at increasing heights. The size of the steps by which the height is increased depends on the starting height. Below a starting height of 0.5 m the step size is 0.1 m while equal to or above 0.5 m the step size is 0.25 m. The fracture drop height is noted for each bottle and from the single values the average fracture drop height is calculated according to the following formula:

$$h_p = \Sigma(h_i)/n_g$$

wherein
$h_p$ = average fracture drop height
$h_i$ = individual fracture drop height
$n_g$ = total number of dropped containers (e) Notched Impact Strength The Charpy notched impact strength (NIS) is measured according to ISO 179 1eA at +23° C., using injection molded bar test specimens of 80×10×4 mm3 prepared in accordance with EN ISO 1873-2.

(f) Haze

Haze is determined according to ASTM D1003-00 on 60×60×1 mm3 plaques injection molded in line with EN ISO 1873-2.

(g) Flexural Modulus

The flexural modulus was determined in 3-point-bending at 23° C. according to ISO 178 on 80×10×4 mm$^3$ test bars injection moulded in line with EN ISO 1873-2.

2. EXAMPLES

The catalyst used in the polymerization process for the propylene copolymer of the inventive examples (IE1) and (IE2) was produced as follows:
Catalyst 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25° C. Mixing speed was adjusted to 170 rpm. 26.0 g of Mgcomplex prepared above was added within 30 minutes keeping the temperature at 25° C. 3.0 ml of ViscoplexR 1-254 and 1.0 ml of a toluene solution with 2 mg Necadd 447™ was added. Then 24.0 ml of heptane was added to form an emulsion.

Mixing was continued for 30 minutes at 25° C., after which the reactor temperature was raised to 90° C. within 30 minutes. The reaction mixture was stirred for a further 30 minutes at 90° C.

Afterwards stirring was stopped and the reaction mixture was allowed to settle for 15 minutes at 90° C. The solid material was washed 5 times:

Washings were made at 80° C. under stirring for 30 min with 170 rpm. After stirring was stopped the reaction mixture was allowed to settle for 20-30 minutes and followed by siphoning.

Wash 1: Washing was made with a mixture of 100 ml of toluene and 1 ml donor Wash 2: Washing was made with a mixture of 30 ml of TiCl4 and 1 ml of donor.

Wash 3: Washing was made with 100 ml of toluene.
Wash 4: Washing was made with 60 ml of heptane.
Wash 5: Washing was made with 60 ml of heptane under 10 minutes stirring.

Afterwards stirring was stopped and the reaction mixture was allowed to settle for 10 minutes while decreasing the temperature to 70° C. with subsequent siphoning, followed by N2 sparging for 20 minutes to yield an air sensitive powder.

Ti content was 3.76 wt-%.
External Donor:

In the Examples, the external donor D (Dicyclopentyl dimethoxy silane CAS 126990-35-0) was used.

The co-catalyst component used was triethyl aluminium (TEAL).

The catalyst and the polymer of CE1 was prepared as described for IE1 of WO 2014/206950 A1. Two propylene copolymers P1 and P2 were produced using the above described catalyst and co-catalyst and using the polymerisation conditions according to Table 1 below.

The polymerization conditions are listed in the Table below.

TABLE 1

| Polymerization conditions | | | |
|---|---|---|---|
| | Unit | P1 | P2 |
| Prepolymerizer | | | |
| Teal | g/t C3 | 150 | 150 |
| Donor | g/t C3 | 60 | 60 |
| Temperature | ° C. | 25 | 25 |
| Loop | | | |
| Temperature | ° C. | 70 | 70 |
| Feed C2/C3 | mol/kmol | 2.36 | 4.65 |
| Feed H2/C3 | mol/kmol | 1.53 | 1.51 |
| MFR | g/10 min | 5.8 | 5 |
| C2 | wt % | 1.3 | 2.6 |
| Split | wt % | 40.8 | 40.2 |
| First gas phase reactor | | | |
| Temperature | ° C. | 80 | 80 |
| C2/C3 | mol/kmol | 39.8 | 39.8 |
| H2/C3 | mol/kmol | 2.51 | 2.59 |
| MFR | g/10 min | 1.53 | 1.48 |
| C2 | wt % | 4.9 | 5 |

Examples IE1, IE2, were prepared by compounding the copolymers P1 (IE1) and P2(IE2) with 0.1 wt.-% of Irganox B225 (1:1-blend of Irganox 1010 and Irgafos 168) of BASF AG, Germany), and 0.05 wt.-% calcium stearate by using a ZSK 57 twin screw extruder, with a melt temperature of 220° C., under nitrogen atmosphere and final polymer properties were measured as shown in Table 2 below.

TABLE 2

Properties of the Examples

| | Unit | IE1 | IE2 | CE1 |
|---|---|---|---|---|
| Base | | P1 | P2 | RB307MO |
| MFR2 | g/10 min | 1.9 | 1.9 | 1.5 |
| NU | | PVCH | PVCH | DMDBS |
| SF | wt % | 13.2 | 13.0 | 7.4 |
| C2 | wt % | 4.9 | 5.0 | 4.7 |
| C2(SF) | wt % | 17.8 | 17.6 | 16.6 |
| C2(CF) | wt % | 3.6 | 3.7 | 4.2 |
| Ratio C2(SF)/C2(CF) | | 5.0 | 4.7 | 3.9 |
| IV | dl/g | 2.6 | 2.6 | 2.9 |
| IV(SF) | dl/g | 1.8 | 1.8 | 1.5 |
| IV(CF) | dl/g | 2.7 | 2.7 | 2.9 |
| Melting temperature | ° C. | 154 | 150 | 144 |
| Crystallisation Temperature | ° C. | 122 | 119 | 113 |
| Flex | MPa | 817 | 792 | 892 |
| NIS/23° C. | kJ/m$^2$ | 39.6 | 40.7 | 15 |
| Haze/1 mm Bottle/0.6 mm | % | 21.4 | 20.1 | 20 |
| Drop height | m | 5.5 | 5.5 | 4 |
| top load | N | 401 | 378 | 411 |
| Haze | % | 29 | 28 | 20 |
| Clarity | % | 79.0 | 79.6 | 74 |

The above results show that the propylene polymer compositions of the present invention combine excellent mechanical properties such as high impact strength and high flexural modulus with improved optical properties such as low haze and high clarity. A particular ratio between C2(SF)/C2(CF) may preferably contribute to the desired combination of properties.

The specific polymer setting provides better impact behavior in the sense of higher impact strength and higher drop height while maintaining optical properties (e.g. haze) at a low level.

The invention claimed is:

1. A propylene polymer composition comprising at least one propylene copolymer (C-PP), and an α-nucleating agent (N), wherein the propylene copolymer (C-PP) comprises two propylene copolymer fractions (PP1) and (PP2), wherein
   propylene copolymer fraction (PP1) is contained in the propylene copolymer (C-PP) in an amount of 30 to 70 wt. % and the propylene copolymer fraction (PP2) is contained in the propylene copolymer (C-PP) in an amount of 70 to 30 wt. %,
   the comonomer content of propylene copolymer fraction (PP1) is in the range of 0.5 to 2.6 wt.-% and the comonomer content of the propylene copolymer fraction (PP1) is lower compared to the comonomer content of the propylene copolymer fraction (PP2), and the propylene polymer composition has
   (a) a melt flow rate MFR$_2$ (230° C.) measured according to according to ISO 1133 of 1 to 5 g/10 min.,
   (b) a comonomer content of 4.0 to 8.0 wt. %, the comonomer(s) being ethylene and/or at least one C$_4$ to C$_{12}$ α-olefin, and
   (c) a soluble fraction (SF), determined by CRYSTEC fractionation with CRYSTEX QC, Polymer Char (Valencia, Spain), of from 8 to 20 wt. %,
   wherein propylene copolymer (C-PP) is obtained in a multi-stage polymerization process in the presence of
   (a) a Ziegler-Natta catalyst (ZN-C) that comprises a titanium compound (TC), a magnesium compound (MC) and an internal donor (ID), wherein said internal donor (ID) is a non-phthalic acid ester,
   (b) optionally a co-catalyst (Co), and
   (c) optionally an external donor (ED),
   wherein the ratio C$_2$(SF)/C$_2$(CF) between the ethylene content C$_2$(SF) of soluble fraction of the propylene copolymer (C-PP) and the ethylene content C$_2$(CF) of crystalline fraction of the propylene copolymer (C-PP) is 4.0 to 6.0.

2. The propylene polymer composition according to claim 1 having
   (a) a melting temperature Tm in the range of from 148 to 162° C.; and/or
   (b) a crystallization temperature Tc of not less than 115° C.

3. The propylene polymer composition according to claim 1 which has
   (c) a Charpy notched impact strength according to ISO 179 1eA at +23° C. in the range of from 20 to 100 kJ/m$^2$.

4. The propylene polymer composition according to any one of claims 1 to 3 wherein the comonomer content of propylene copolymer fraction (PP2) is in the range of 6 to 20 wt. %.

5. The propylene polymer composition according to claim 1 wherein propylene copolymer fraction (PP1) and propylene copolymer fraction (PP2) differ in their melt flow rate MFR$_2$ (230° C.) measured according to according to ISO 1133.

6. The propylene polymer composition according to claim 1 wherein the melt flow rate MFR$_2$ (230° C.) of the propylene copolymer fraction (PP1) to the melt flow rate MFR$_2$ (230° C.) of the propylene copolymer (C-PP) differ by no more than 6.0 g/10 min., measured according to ISO 1133, respectively.

7. The propylene polymer composition according to claim 1 comprising an α-nucleating agent (N) selected from the group consisting of
   (i) salts of monocarboxylic acids and polycarboxylic acids,
   (ii) dibenzylidenesorbitol and C$_1$-C$_8$-alkyl-substituted dibenzylidenesorbitol derivatives, or substituted nonitol-derivatives,
   (iii) salts of diesters of phosphoric acid,
   (iv) polymeric α-nucleating agent, and
   (v) mixtures thereof.

8. The propylene polymer composition according to claim 7, wherein the α-nucleating agent is selected from vinylcycloalkane polymers and vinylalkane polymers.

9. A method of producing the propylene polymer composition according to claim 1, wherein propylene copolymer (C-PP) is obtained in a multi-stage polymerization process in the presence of
   (a) a Ziegler-Natta catalyst (ZN-C) comprises a titanium compound (TC), a magnesium compound (MC) and an internal donor (ID), wherein said internal donor (ID) is a non-phthalic acid ester,
   (b) optionally a co-catalyst (Co), and
   (c) optionally an external donor (ED), wherein the ratio $C_2(SF)/C_2(CF)$ between the ethylene content $C_2(SF)$ of soluble fraction of the propylene copolymer (C-PP) and the ethylene content $C_2(CF)$ of crystalline fraction of the propylene copolymer (C-PP) is 4.0 to 6.0.

10. The method according to claim 9, wherein the internal donor (ID) is selected from the group consisting of optionally substituted malonates, maleates, succinates, glutarates, cyclohexene-1,2-dicarboxylates, benzoates and derivatives and/or mixtures thereof.

11. An extrusion blow molded article comprising the propylene polymer composition according to claim 1.

12. The extrusion blow molded article according to claim 11 having a Charpy notched impact strength according to ISO 179 1eA at +23° C. in the range of from 20 to 100 kJ/m$^2$.

13. The extrusion blow molded article according to claim 11 being a bottle or a container.

14. A method of preparing an extrusion blow molded article comprising extrusion blow molding of a propylene polymer composition according to claim 1.

* * * * *